United States Patent [19]

Stuart

[11] Patent Number: 5,031,330
[45] Date of Patent: Jul. 16, 1991

[54] ELECTRONIC BORESIGHT

[75] Inventor: Kenneth Stuart, Los Altos Hills, Calif.

[73] Assignee: Kaiser Aerospace & Electronics Corporation, Oakland, Calif.

[21] Appl. No.: 396,883

[22] Filed: Aug. 22, 1989

Related U.S. Application Data

[63] Continuation of Ser. No. 146,002, Jan. 20, 1988, abandoned.

[51] Int. Cl.$^5$ .............................................. G01C 9/06
[52] U.S. Cl. ........................................ 33/366; 33/645; 33/286
[58] Field of Search ................. 33/228, 234, 236, 286, 33/301, 318, 319, 321, 361, 366, 645, 333, 613

[56] References Cited

U.S. PATENT DOCUMENTS

| | | |
|---|---|---|
| 1,237,734 | 8/1917 | Wood . |
| 3,081,552 | 3/1963 | Reason . |
| 3,160,237 | 12/1964 | Reason et al. . |
| 3,387,491 | 6/1968 | Adams . |
| 3,486,238 | 12/1969 | Hansen . |
| 3,537,307 | 11/1970 | Pliha . |
| 3,596,363 | 8/1971 | Squire et al. . |
| 3,731,543 | 5/1973 | Gates ................................. 33/318 X |
| 3,816,935 | 6/1974 | Wilmot ............................. 33/318 X |
| 3,939,571 | 2/1976 | Studdard . |
| 4,344,235 | 8/1982 | Flanders . |
| 4,470,199 | 9/1984 | Krezak et al. ..................... 33/382 X |
| 4,483,080 | 11/1984 | Knoll .................................... 33/286 |

Primary Examiner—Harry N. Haroian
Attorney, Agent, or Firm—Townsend and Townsend

[57] ABSTRACT

Pairs of level sensing devices are used in a method that aligns plane surfaces to one another. One of the pairs of level sensing devices is located on each of the plane surfaces. The level sensing devices of each pair are aligned and positioned parallel to two orthogonal axes of the plane. The output signals from corresponding ones of the pairs are differentially compared, and one of the platforms adjusted in pitch and roll to minimize the values produced by the differential comparison. The platforms are then tilted equal amounts and adjusted in azimuth.

15 Claims, 4 Drawing Sheets

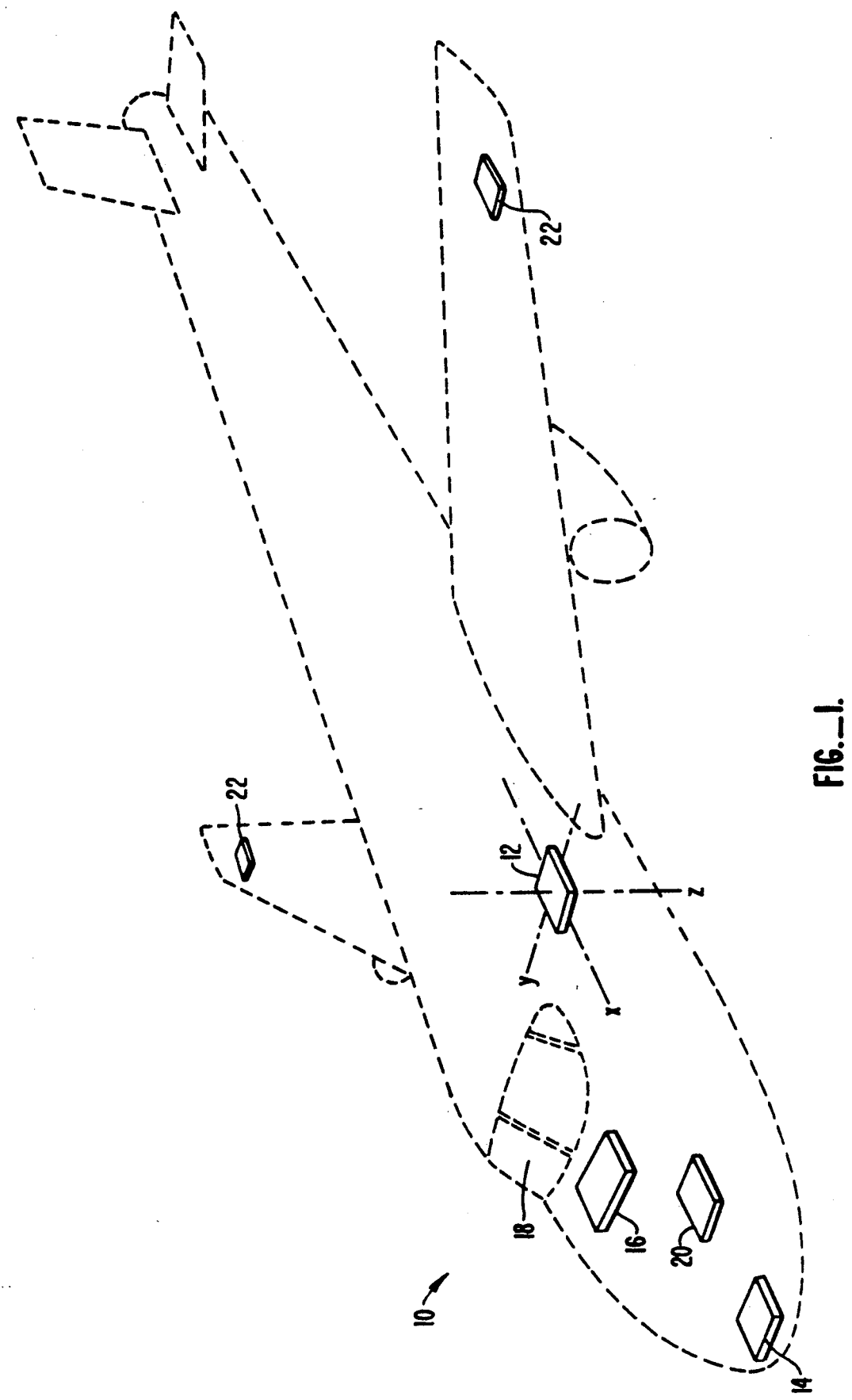
FIG._1.

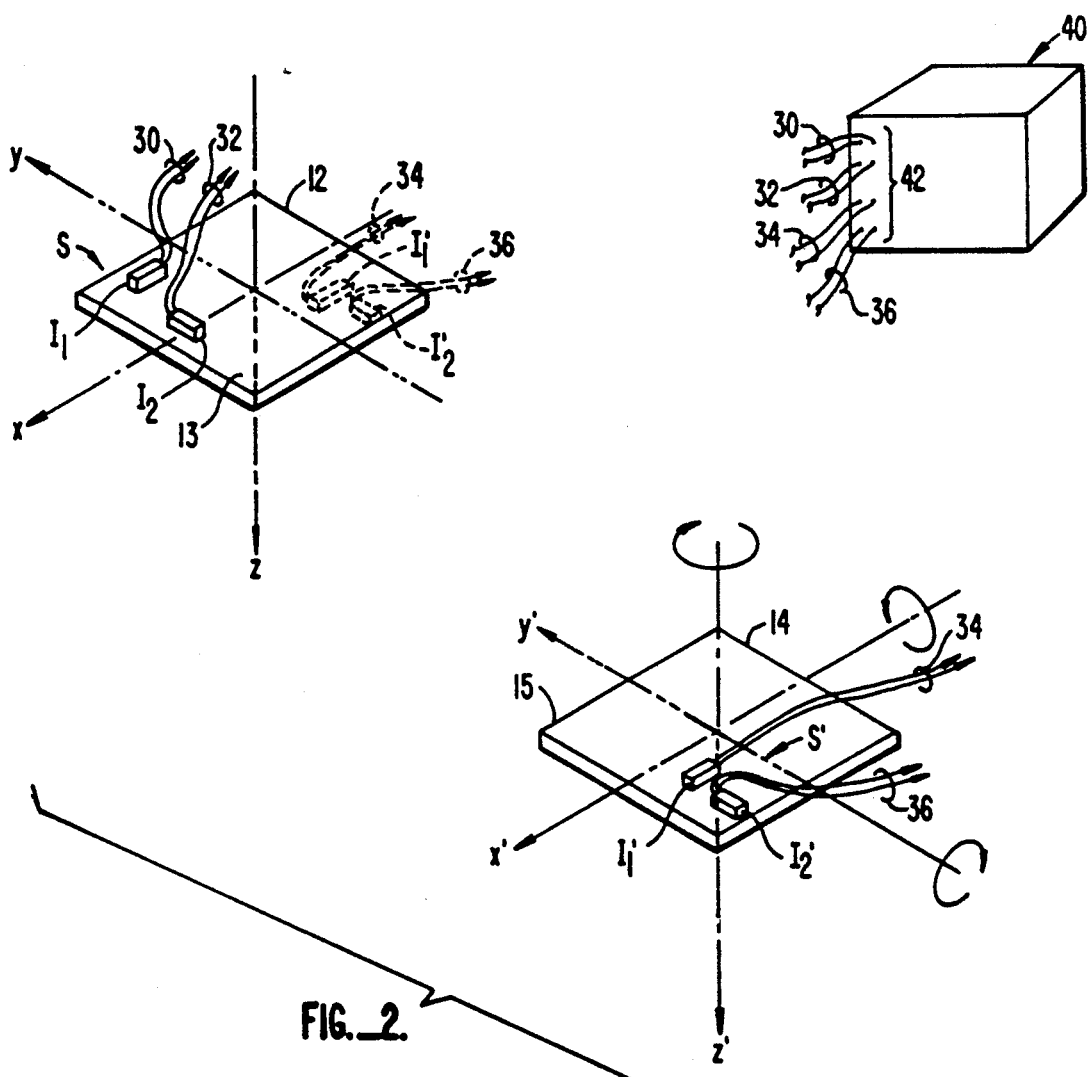
FIG._2.

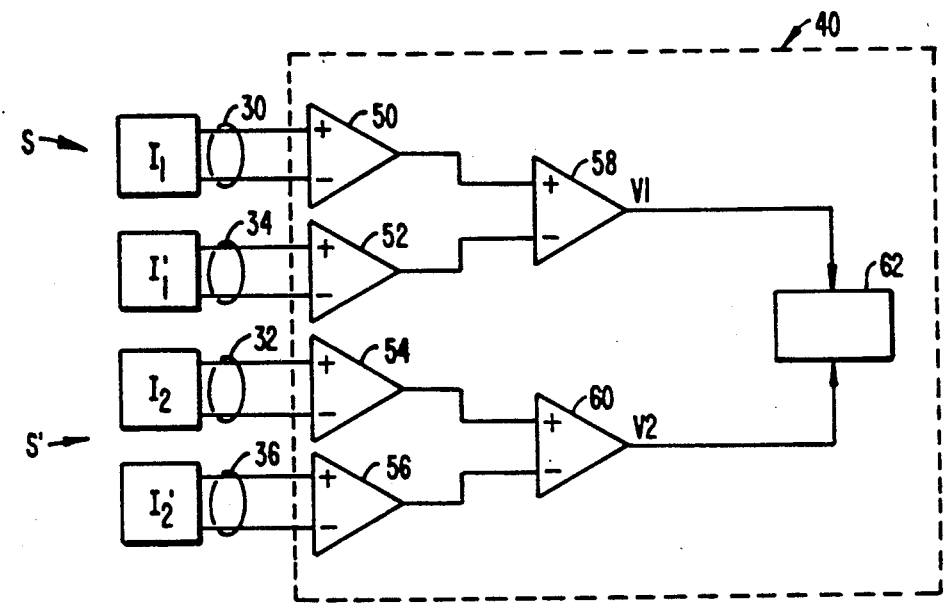
FIG._3.
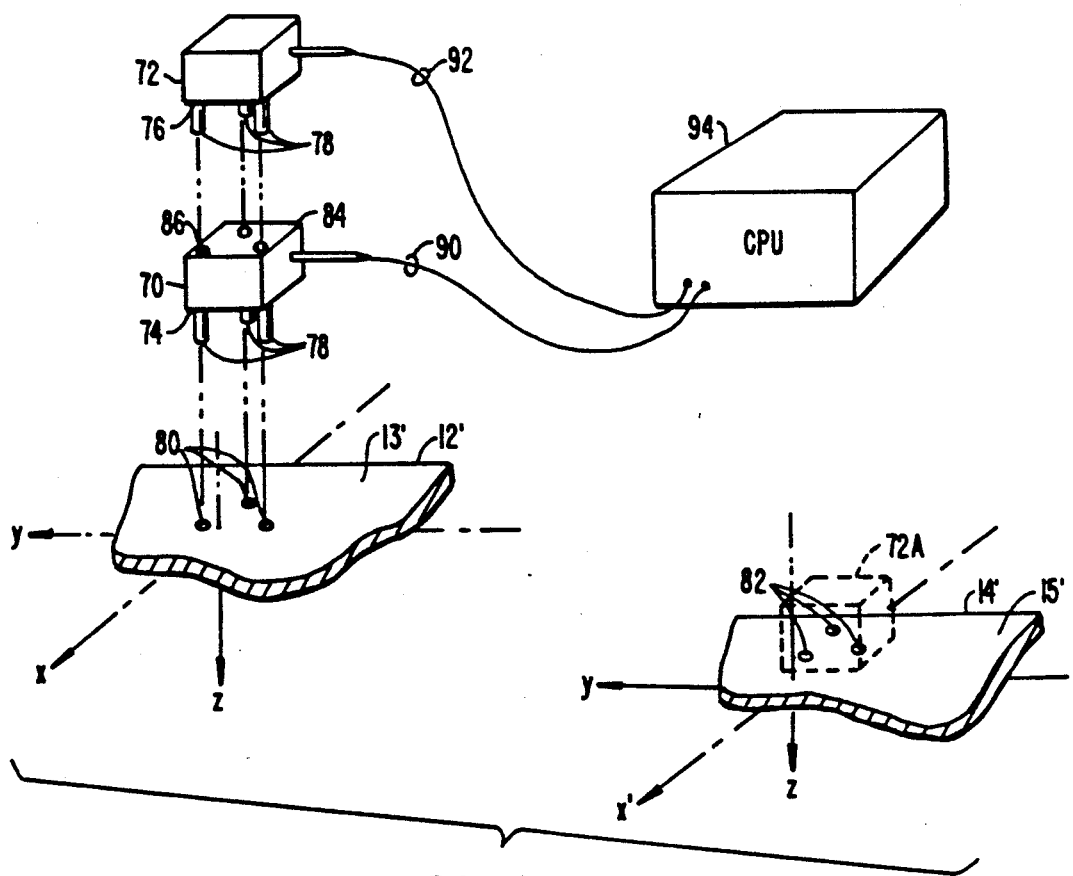
FIG._4.

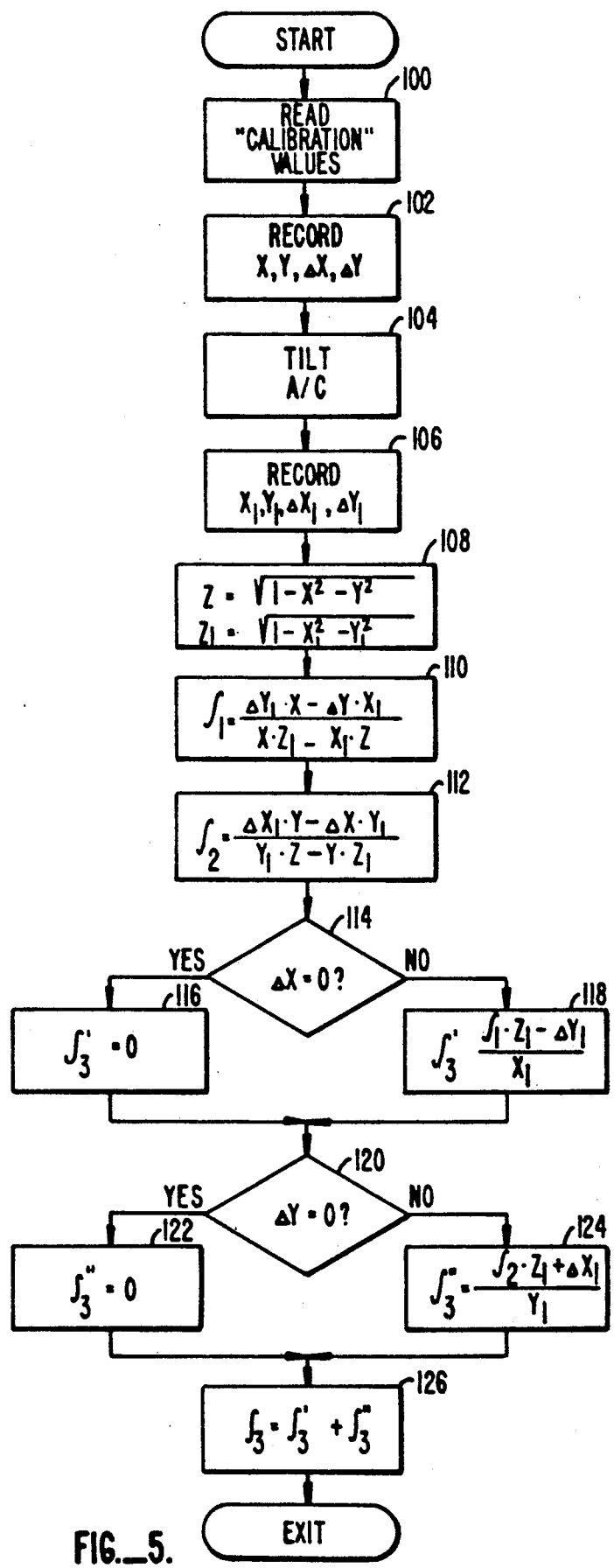
FIG._5.

ELECTRONIC BORESIGHT

This is a continuation of Ser. No. 146,002 filed 1/20/1988, now abandoned.

BACKGROUND OF THE INVENTION

The present invention is directed to a method for aligning two or more planar surfaces to one another in pitch, roll, and azimuth.

Aircraft and spacecraft often carry instrumentation and equipment that are mounted on various platforms. It is often desirable, if not necessary, that there be alignment between various of the instrumentation and/or equipment as well as with the pitch, roll and azimuth axes of the aircraft itself. Typically, the platforms carrying the instruments and instrumentation (sometimes referred to as "slave" platforms) are harmonized (i.e., aligned) in pitch, roll, and azimuth to a reference or "master" platform that in itself is assumed or inherently aligned with the major axes of the aircraft.

Alignment of the slave platforms to a master platform or to the aircraft itself has historically been via optical metrology, including borescopes and target boards that are remotely positioned from the aircraft. In some cases, retroflectors set on a precise optical jig have attached to the aircraft and autocollimation techniques used to boresight and harmonize various units carried by the aircraft. These techniques, however, are labor-intensive and, for that reason, can be time-consuming and expensive.

More recently, systems have incorporated sensitive differential electronic levels, or inclinometers, that allow alignment of equipment in pitch and roll. Alignment along the azimuth was still performed using optical metrology.

One such system, using inclinometers, is found in apparatus in the form of a two-plane assembly. One plane of the apparatus is skewed with respect to the other in pitch and roll by about 0.5° each. Each plane carries an orthogonal pair of inclinometers. In use, the apparatus is first mounted to a master platform of the aircraft, and measurements taken of each inclinometer. The apparatus is then moved to a slave platform that is to be aligned with the master platform. The slave platform is then adjusted in roll pitch, and azimuth until all inclinometer measurements produced by the two-plane assembly correspond to those taken on the master platform. In order for this technique to be feasible, the aircraft must be minimally 0.1° inclined in both pitch and roll with respect to a pure horizontal. Also, the aircraft must be perfectly static during the procedure, precluding the method's use in situations involving aircraft motion (e.g., around aircraft carriers, in flight, etc.). An example of this system can be found in U.S. Pat. No. 4,470,199.

SUMMARY OF THE INVENTION

The present invention provides a quick and easy method of harmonizing (i.e., aligning) two surfaces in the three axes of roll, pitch, and azimuth, without resort to present boresight techniques. The inventive method, as will be seen, can also be used to maintain, continuously, that alignment for relatively slow, cyclical misalignments between the two surfaces.

Broadly, the method of the present invention uses two sets of inclinometers, each inclinometer of a set being oriented generally orthogonal relative to the other of the set. The method then proceeds as follows: First, the two sets of inclinometers are placed on the same surface, or otherwise oriented so that they are harmonized to one another, and calibrated (i.e., adjusted) so that their respective electronic outputs, corresponding to the principal axes (pitch and roll), are zero. Next, one of the inclinometer sets is placed on a "master" platform (i.e., the platform to which another or others will be harmonized), the other set is placed on a "slave" platform (i.e., the platform to be harmonized with the master platform), and the inclinometers of each set oriented in pitch and roll. The electronic outputs of corresponding inclinometers of the two sets are then compared differentially to obtain error signals in roll or pitch. The amount of any error signal obtained is directly proportional to the misalignment in pitch and roll of the master and slave platforms. At this point, the slave platform is adjusted in roll and pitch to minimize or zero any difference readings. When this is done, the structure carrying the two platforms (e.g., the aircraft) is tilted a small amount (i.e., 2°–4°) sufficient to induce difference readings of the electrical outputs of the differentially compared inclinometers. The slave platform is then rotated about a principal axis normal to the platform. When the readings are again zero or minimum the two platforms are harmonized in roll, pitch, and azimuth.

BRIEF DESCRIPTION OF THE DRAWINGS

FIG. 1 is a perspective view of an aircraft, illustrating schematically various platforms, including a master platform;

FIG. 2 is a schematic illustration of two of the platforms shown in FIG. 1, illustrating use of sensor devices (e.g., inclinometers) used in the method of the present invention;

FIG. 3 is a schematic representation of how the sensors are differently compared one to the other;

FIG. 4 is an illustration of a preferred embodiment of the invention; and

FIG. 5, diagrammatically illustrates use and operation of the embodiment of the invention shown in FIG. 4.

DETAILED DESCRIPTION OF THE INVENTION

In FIG. 1 is illustrated an aircraft, generally designated with the reference numeral 10. Typically, aircraft 10 will have mounted therein a master platform 12 which may carry an inertial measuring unit (not shown), providing information as to aircraft attitude. It is assumed that the master platform 12 is aligned or otherwise harmonized with the primary axes X, Y and Z (i.e. roll, pitch, and azimuth, respectively) of the aircraft in order for the information provided by the inertial measuring unit (not shown) to be useful.

Other platforms are also carried by the aircraft 10. For example, weather radar, or camera equipment, may be mounted on a platform 14; display equipment, such as a heads-up display assembly of the type that projects virtual imagery upon the windscreen 18 of the aircraft 10, may be carried by platform 16 side slip transducer instrumentation may be carried by platform 20; and platforms 22, located proximate each wing tip of the aircraft 10, may support flux valve gate compass instrumentation.

Of course, more instruments and equipment can be introduced and added to the just-listed exemplary equipment, such as, for example, the mounting of armament for air defense purposes, bombing sights, and the like. The point is that all such slave platforms 14-22 should be aligned to the master platform 12 so that the data produced by the inertial navigation unit carried by the master platform 12, and used by the equipment carried by the slave platforms 14-22, can have accurate meaning.

Before continuing, it should be understood that although the method of the present invention and apparatus described for use with that method are capable of harmonizing any two platforms or surfaces. In particular, the invention has been developed for use in "boresighting" platforms (i.e., harmonizing or aligning) to one another carried by aircraft. Such platforms (sometimes referred to in this art as "trays") usually have some device to accurately locate the avionic equipment that the platform is to carry. Such devices can also be used to accurately locate the sensor sets described herein. A discussion of how the sensor sets are to be located accurately, and where, is beyond the scope of this invention, and it will be evident to those skilled in this art that a number of ways can be used.

Also, such platforms are also usually provided with apparatus that provide adjustment capability such as, for example, shimming the platform or some form of screw jack arrangement. When, in the following discussion, reference is made to adjustment of the platform, apparatus such as this (or their equivalents) is meant.

Referring now to FIGS. 2 and 3, the underlying concept of the inventive method will now be described. First, with reference to FIG. 2, there are illustrated two of the platforms, the master platform 12 and the slave platform 14, illustrated in FIG. 1. As discussed, the master platform 12 is assumed to be aligned with the major axes of the aircraft: that is, the surface 13 of the master platform 12 has its X, Y and Z coordinates co-linear with the roll, pitch, and azimuth axes, respectively, of the aircraft 10. The platform 14 has a planar surface 15 whose orientation is defined by the axes X', Y' and Z'.

As FIG. 2 illustrates, the invention uses sensor sets S and S', each respectively comprising a pair of inclinometers $I_1$, $I_2$ and $I'_1$ and $I'_2$. The sensor set S' is shown in phantom on the surface 13 of the platform 12, to indicate that their location thereat is merely temporary: after the initial step of the method, the sensor set S' is relocated to the surface 15 of the platform 14.

Inclinometers of the type described herein can be implemented using a standard, off the shelf configuration of accelerometers such as those manufactured by Aero Products Company, a division of Litton Industries, located at 6700 Eton Avenue, Canoga Park, Calif. and identified as an A-4 Accelerometer. This type of accelerometer configuration is constructed to provide an output signal that is indicative of deviations from horizontal. It should be apparent to those skilled in this art, however, that other devices may be used to obtain signals indicative of deviations from horizontal.

The method of the present invention begins by what may be called a calibration step, ensuring that if the two sensor sets are aligned one to the other, they will give the same output signals. This is important, for as will be seen, the method compares the outputs of the sensor sets to obtain an error signal that is indicative of misalignment between a master and a slave platform, Thus, the sensor sets S and S' are placed on the surface 13 of the platform 12. Although not specifically illustrated, the sensor set S is preferably removably attached to the surface 13 by an conventional means known in the art. The actual method of attachment is beyond the scope of this invention, and is therefore not described. What is important, however, is that the inclinometers $I_1$ and $I_2$ are arranged so that they are substantially perpendicular to one another and respectively co-linear with the X, Y axis of the surface 13.

The presence of the sensor set S' on the surface 13 of the platform is temporary. The inclinometers $I_1'$ and $I_2'$ of the sensor sets S' are also arranged so that they are substantially perpendicular to one another, and corresponding ones of the inclinometers of the two sensor sets S and S' are positioned co-linear with one another; that is, inclinometers $I_1$ and $I_1'$ are positioned co-linear to each other, while inclinometers $I_2$ and $I_2'$ are co-linear.

So arranged, the output lines 30, 32, 34 and 36 from the inclinometers $I_1$, $I_2$, $I_1'$ and $I_2'$, respectively, are connected to input terminals 42 of a signal processor 40. A primary function of the signal processor 40 is to differentially measure the output signals produced by the respective inclinometers of the sensor sets S and S'. Illustrated in general schematic form in FIG. 3 is this operation.

The inclinometer output lines 30-36 are coupled to electronic circuits in the signal processor 40 so that corresponding ones of the inclinometers, i.e., inclinometers $I_1$, $I_2$, $I_1'$ and $I_2'$, are differentially compared to one another to produce error signs V1 and V2 (FIG. 3). Thus, as FIG. 3 illustrates, the signals produced by the inclinometers $I_1$, $I_2$, $I_1'$ and $I_2'$ are individually applied to preamplifiers 50, 52, 54 and 56, respectively, obtaining a preamplification of each of the deviation signals produced by the inclinometers. The outputs of the preamplifiers 50 and 52 are then differentially amplified by differential amplifier 58 to produce the error voltage V1, which indicates any difference in attitude between the inclinometer $I_1$ of the sensor set S and the inclinometer $I_1'$ of the sensor set S'. Similarly, the output signals produced by the corresponding inclinometers $I_2$ and $I_2'$ are preamplified by the preamplifiers 54 and 56 and differentially amplified by the differential amplifier 60 to produce the error voltage V2, which indicates any difference in attitude between the inclinometers $I_2$ and $I_2'$. The two difference signals V1 and V2 can then be applied to a display mechanism 62 to provide one with a visual representation of the error voltages.

The inclinometers $I_1'$ and $I_2'$ should be in harmony with those of the set of sensors S when placed on the same surface. i.e., surface 13 of the platform 12. If the readings obtained from the display mechanism 62 indicate that one or the other (or both) of the error voltages V1, V2 is not zero, the corresponding inclinometers of the sensor sets S and S' are not co-linear and inclinometers $I_1'$ and $I_2'$ are adjusted by appropriate means until the error voltages V1 and V2 are each zero. This ends the calibrating portion of the method.

It should be evident to those skilled in this art that it is not necessary to perform the above-described calibration, using the master platform 12. Rather, a test jig can be prepared to accept the sensor sets S and S' in an aligned manner. The calibration step, therefore, could then be performed at a location remote form the platforms to be harmonized at a more convenient time, and later used to harmonize the platforms, in the manner to be described.

The sensor set S' is then removed from the surface 13 of platform 12 and placed on the surface 15 of the platform 14 (together with whatever means, if any, was used for the adjustment), where it will remain. Accordingly, appropriate fastening means (not shown) may be used to removably fix the sensor set S' in place on the platform 14, as was done with the inclinometers $I_1$ and $I_2$ on platform 12. The signal lines 34 and 36 from the inclinometers $I_1'$ and $I_2'$ remain connected (or are reattached) to the signal processor 40.

Again, any error voltages V1 and V2 are viewed on the display mechanism 62. As indicated above, the sensors sets were aligned and provided with adjustment apparatus so that if the two sensor sets S and S' are placed on two different surfaces, and connected to the signal processor 40, any error voltage readings (V1 and/or V2) should be attributable solely (or principally) to any misalignment between the surfaces. Thus, if the error voltages are not zero (or minimal), the platform 14 is adjusted until they are zero to place the surface 15 in parallel relation to the surface 13. What now remains is to align the platform 14 in azimuth with platform 12.

Azimuth alignment requires that the aircraft 10 be tilted a small amount, either in pitch, roll, or both. The amount of tilt must be sufficient to induce an error voltage V1, or V2, or both. A tilt in the amount of approximately 2' or more will be sufficient for this purpose.

Once the error voltage or voltages are so induced, the platform 14 is adjusted about its Z' axis until the error voltage or voltages are brought back to zero, thereby harmonizing the platforms 12 and 14 in roll, pitch, and azimuth.

The process can be repeated for each of the other platforms 16, 20 and 22, except that the calibration step need not be performed.

In summary, to harmonize two plane surfaces to one another, such as the surfaces 13 and 15 of the platforms 12 and 14, a three-step process using two sets of sensors, each comprising a pair of orthogonally oriented inclinometers (or other horizontally measuring devices) is implemented in the following manner:

a. First, the two sensor sets S and S' are calibrated such as by placing them on the same surface (i.e., the surface 13 of platform 12), corresponding ones of the inclinometers ($I_1/I_1'$, $I_2/I_2'$) arranged co-linear with one another and their outputs differentially compared. Any error in attitude between corresponding inclinometers is adjusted.

b. Second, one of the sensor sets (S') is removed from the surface 13 of the platform 12) and placed on the surface 15 of the platform 14 and, the corresponding inclinometers of the two sensor sets (S and S') positioned co-linearly. If a differentially measured error is produced, the slave plane is adjusted to obviate that error, placing the slave plane (15) in co-planar relation with that of the master plane.

c. Third, and finally, the two platforms are tilted the same amount (and the same orientation) to induce an error in the differentially measured error signals from the inclinometers. The platform being adjusted is then rotated to azimuth to zero the error signals, placing the slave platform in roll, pitch and azimuth harmonization with the master platform.

Having now described the underlying concepts of the method of the present invention, the preferred embodiment of the invention can now be discussed. Turning to FIG. 4, there is illustrated sensor modules 70 and 72, each identically comprising a cluster of inertial-quality accelerometers oriented, within the module 70, 72, orthogonal to one another.

Each sensor module 70, 72 has formed on an underlying surface 74, 76, respectively, alignment pins 78 protruding therefrom. The surfaces 74, 76, together with the alignment pins 78, are optically aligned for precise orientation of the contained accelerometers. Formed in the surfaces 13' and 15' of each of the platforms 12' and 14', as illustrated in FIG. 4, are apertures 80 and 82 configured to respectively receive the extending pins 78 of the sensor modules 70 and 72. The apertures 80 and 82, together with the portion of the surfaces in which they lie, are formed and configured to accurately align the respective sensor modules 70, 72, and the accelerometers that they contain, with respect to the X and Y axes of the platforms 12 and 14 (FIG. 2).

In addition, the top surface 84 has formed therein apertures 86. These are also configured and adapted to receive the alignment pins 78 extending from the bottom surface 76 of the sensor module 72.

The modules 70, 72 incorporate a commercially available device containing three accelerometers, each oriented to measure acceleration in one of three orthogonal axes (x, y, z). Only two of the accelerometers are used for the present invention, however: Those measuring the x and y axis. Such a device is that manufactured by Litton Aero Products of Canoga Park, Calif., and identified as an A-4 Accelerometer. The device is designed to produce a digital output, indicative of the deviation from normal, for each of the three accelerometers contained in the module.

The digital output signals from each of the accelerometers contained in the sensor modules 70, 72 are communicated, via signal lines 90, 92, to a central processing unit (CPU) 94.

Operation of the system illustrated in FIG. 4 proceeds along the lines of the method described with respect to FIGS. 1-3, above, with some differences due to the elements used to implement the method: First, the sensor module 70 is placed on the platform 12' by inserting the extending alignment pins 78 into the apertures 80 formed in the surface 13', thereby aligning the sensor module 70, and the accelerometers it contains, with the X, Y axes of the platform, Next, the extending alignment pins 78 of the sensor module 72 are inserted into the apertures 86 formed in the top surface 84 of the sensor module 70. This stacked arrangement aligns the corresponding accelerometers of the two sensor modules 70 and 72 with one another. It should be noted that the apertures 80, 82 and 86, and alignment pins 78 are positioned and oriented to correctly align the contained accelerometers.

Before continuing, it will be evident to those skilled in this art that the two modules need not be calibrated using platform 12'. A special test stand could be fabricated to accept the sensor modules 70 and 72 in the same stacked arrangement just described, and calibration checked at a location more convenient than in the aircraft.

With the two sensor modules 70 and 72 in this stacked arrangement on the master platform 12', and referring to step 100 (FIG. 5), the CPU 94 reads and stores the signals produced by each of the accelerometers for the X, Y axes of the platform 12'.

The CPU now has available to it the readings of the individual accelerometers of the sensor modules 70 and 72. It can now compare the values obtained for corresponding ones of accelerometers for each of the X, Y axis and, if any deviation is found in the values of the sensor module 72 when compared to the corresponding values obtained from the sensor module 70, compute appropriate correction factors. These correction factors can then be used to correct roll, pitch, and azimuth information sent to the avionic equipment (not shown) mounted on the platform to be aligned with the platform 12': Platform 14' in the example of this discussion. Thus, rather than having to shim or otherwise adjust the sensor module that will be placed on the platform 14' so that it is harmonized with the sensor module 70 on platform 12', the adjustment can be made electronically by the CPU 94, using offsets or correction factors. As will be seen, the same correction/adjustment can be made to harmonize the two platforms 12' and 14'.

Having now "calibrated" the sensor module 72 (step 100—FIG. 5), it is removed from the top of the sensor module 70 and placed on the platform 14', as illustrated at 72A in phantom, with the alignment pins 78 being received by the apertures 82 formed in the surface 15'. Proceeding to step 102, the CPU 94 again reads and records the output signals produced by each of the accelerometers contained in sensor modules 70, 72. The CPU 94 keeps the X and Y values provided by the accelerometers contained in the sensor module 70, and uses the X' and Y' values obtained from the accelerometers of the sensor module 72 to calculate the deviations (in roll and pitch) between the two platforms 12' and 14'. Thus, as indicated at step 102 of FIG. 5, $\Delta x$ (by subtracting the X' value from the X value provided by the sensor modules 72 and 70, respectively) and $\Delta y$ (the Y' value minus the Y value) values are formed and retained.

Next, the aircraft 10 (FIG. 1) is tilted in step 104, and, as step 106 indicates, the values produced by the individual accelerometers of the sensor module 70 (which now produce the values $X_1$ and $Y_1$) and sensor module 72 (which produces the values $X_1'$ and $Y_1'$) and calculates the deviation $\Delta X_1$ ($X_1'-X_1$) and $\Delta Y_1$ ($Y_1'-Y_1$).

With step 108 the azimuth values (Z and $Z_1$) for the platform 12' are respectively created by taking the square roots of $(1-X^2-Y^2)$ untilted condition, and $(1-X_1^2-Y_1^2)$, tilted condition. Steps 110 and 112 form the misalignment values in roll ($\delta_1$) and pitch ($\delta_2$) between the platforms 12' and 14'.

All that is left to do is to determine the yaw (i.e., azimuth) misalignment ($\delta_3$) between the platforms 12' and 14'. This is done in steps 114 through 124. Step 114 tests to determine if there is a portion of azimuth misalignment between the platforms due to pitch. If not, the misalignment value $\delta_3'$ is set to zero in step 116, and the method proceeds to step 120. If, however, there is a pitch contribution to an azimuth misalignment, that misalignment is calculated in step 118, wherein is developed the azimuth misalignment component $\delta_3'$.

Step 120 determines whether or not there is an azimuth misalignment due to roll. If not, the azimuth misalignment component (roll), $\delta_3''$ is set to zero (step 122) and, as indicated the method proceeds to step 126 where the entire azimuth misalignment value, $\delta_3$, is produced. If, however, roll does contribute to azimuth misalignment, that component, $\delta_3''$, is calculated in step 124 before proceeding to step 126 to calculate the azimuth misalignment value, $\delta_3$.

Once the azimuth misalignment is determined, the CPU 94 now has sufficient information and values to make the necessary corrections to information provided to, or supplied by, any avionic equipment that may be placed on the platform 14', insofar as that equipment may incorporate or rely upon aircraft attitude. It should be evident to those skilled in this art that the CPU 94 can develop the necessary offset values that can be used to compensate for misalignment (in pitch, roll, pitch, and/or azimuth) in the platform 14', relative to the platform 12'. The adjustment of the platform 14', to harmonize it with platform 12', is done electronically, rather than physically.

Using the preferred embodiment of the invention (FIG. 4) as described with reference to FIG. 5, permits one to take advantage of such processing techniques as recursive filtering or Kalman filtering to develop extremely accurate misalignment correction factors. In addition, slight misalignments between a master and slave platforms may occur in an airborne aircraft due to period deformation of the air frame. The present invention allows an "on-line", continuous harmonization of roll, pitch and yaw to overcome periodic occurring misalignments that may occur, for example, in flight.

I claim:

1. A method for aligning one generally horizontal plane surface to another, each of the planes having a pitch and a roll axis, the method comprising:
   providing a pair of sensor means, each sensor means including first and second level sensing means of the type producing output signals indicative of deviations from horizontal;
   placing each one of the pair of sensor means on the one plane surface and the other plane surface, respectively, the first level sensing means of each pair of sensor means being located substantially parallel to a pitch axis, the second level sensing means being located substantially perpendicular to the pitch axis;
   adjusting the pitch and roll of the other plane surface such that the output signals from the first and the second corresponding ones of the level sensing means are equal to one another, respectively;
   tilting the one and the other plane surface substantially equally to produce different output signals from corresponding ones of the first and the second level sensing means of the pair of sensors, respectively; and
   rotating in azimuth the other plane surface such that the different output signals from the corresponding ones of the first and second level sensing means are minimized.

2. The method of claim 1, including the step of:
   calibrating the pair of sensor means by placing them on the one plane surface in a manner that permits the first and second level sensing means of each sensor means to respectively measure pitch and roll of the one plane surface, and adjusting the sensor means so that the first inclinometers and the second inclinometers are substantially co-linear to one another, respectively.

3. The method of claim 1, wherein the level sensing means are each inclinometers.

4. The method of claim 1 wherein the level sensing means are accelerometers.

5. The method of claim 1 wherein the providing step includes the step of adjusting the sensor means so that the first level sensing means and the second level sensing means of each of the pair of sensor means are substantially parallel to one another, respectively.

6. The method of claim 1 wherein the steps of adjusting, tilting and rotating are performed while the horizontal planes are undergoing dynamic motion.

7. Apparatus for aligning one plane surface to another plane surface in roll, pitch, and azimuth, the apparatus comprising:
   a pair of sensor means each configured for placement on the one and the other plane surfaces, respectively, each sensor means including a first level sensing means adapted to be located substantially parallel to a pitch axis lying in the corresponding plane surface and a second level sensing means adapted to be located substantially perpendicular to corresponding first level sensing means, each of the level sensing means being of the type operable to produce an output signal indicative of deviations from horizontal;
   signal processing means coupled to receive the output signals of each of the first and second level sensing means for comparing the output signals of the first level sensing means to one another and the output signals of the second level sensing means to one another to produce firsts and second deviation signals therefrom; and
   display means for displaying the first and second deviation signals;
   whereby, the other plane surface can be adjusted in roll, pitch, and azimuth until the displayed first and second deviation signals are minimized to harmonize the one plane surface to the other plane surface.

8. The apparatus of claim 7, wherein the first and second level sensing means are inclinometers.

9. The apparatus of claim 7, wherein the output signals are digital in form, and wherein the signal processor means includes digital means for comparing the output signals.

10. The apparatus of claim 4, wherein the signal processor means includes means for producing correction values from the first and second deviation values.

11. The apparatus of claim 10, wherein the one plane surface is adapted to carry a first electronic unit operable to produce heading signals indicative of direction and attitude, and wherein the other plane surface is adapted to carry second electronic unit operable to receive heading information, the signal processor means including means operable to receive the heading signal from the first electronic unit to produce therefrom and the deviation signals the heading information, and means for coupling the heading information to the second electronic unit.

12. The apparatus of claim 7, the signal processor means including differential comparing means for differentially comparing the first output signals and the second output signals to one another to respectively produce the first and second deviation signals.

13. The apparatus of claim 7 wherein the first and second level sensing means are accelerometers.

14. The apparatus of claim 7 wherein the adjustment in roll, pitch and azimuth occurs during dynamic movement of the planar surfaces.

15. In an aircraft having two generally horizontal planar surfaces each having a pitch, roll, and yaw alignment axis, a method for aligning a first planar surface to the second planar surface, the method comprising the steps of:
   providing a pair of sensing apparatus disposed on the planar surfaces, each sensing apparatus including a first and a second level sensing device of the type producing output signals indicative of deviations from horizontal, said first and second level sensing devices of one sensing apparatus disposed orthogonal to one another and substantially parallel to corresponding first and second level sensing devices of the other sensing apparatus, one of the pair of sensing apparatus disposed on the first planar surface and the other one of the pair of sensing apparatus disposed on the second planar surface;
   providing a central processing unit having arithmetic functions coupled to said pair of sensing apparatus for reading and storing data from said level sensing devices;
   providing data from the level sensing devices to the central processing unit during a flight of the aircraft;
   calculating a first, a second, and a third correction factor for each of the alignment axes during the flight; and
   utilizing the correction factors to harmonize the first planar surface to the second planar surface to correct pitch, roll, and azimuth alignment axis misalignments between the two planar surfaces during the flight.

* * * * *